(12) United States Patent
Sundara et al.

(10) Patent No.: US 6,360,228 B1
(45) Date of Patent: Mar. 19, 2002

(54) TRANSACTIONAL FRAMEWORK FOR EXECUTING STATEMENTS INVOLVING NON-NATIVE CODE

(75) Inventors: Seema Sundara, Nashua, NH (US); Ravi Murthy, Sunnyvale; Nipun Agarwal, San Mateo, both of CA (US); Jagannathan Srinivasan, Nashua, NH (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/324,605

(22) Filed: Jun. 2, 1999

(51) Int. Cl.[7] .............................................. G06F 17/30
(52) U.S. Cl. ......................... 707/102; 707/1; 707/202; 713/202
(58) Field of Search .................. 707/102, 103, 707/8, 10, 1, 202; 709/223, 224, 107; 713/202; 717/1, 10

(56) References Cited

U.S. PATENT DOCUMENTS

| | | | | |
|---|---|---|---|---|
| 5,625,815 A | * | 4/1997 | Maier et al. ................... 707/8 |
| 5,745,753 A | * | 4/1998 | Mosher, Jr. ................. 707/202 |
| 5,819,251 A | * | 10/1998 | Kremer et al. ................. 707/1 |
| 5,893,104 A | * | 4/1999 | Srinivasan et al. .......... 707/102 |
| 5,935,251 A | * | 8/1999 | Moore ........................ 713/202 |
| 6,021,438 A | * | 2/2000 | Duvvoori et al. ............ 709/224 |

* cited by examiner

*Primary Examiner*—Diane D. Mizrahi
(74) *Attorney, Agent, or Firm*—Hickman Palermo Troung & Becker LLP; Marcel K. Bingham (57) ABSTRACT

Described herein is a framework for providing statement atomicity for DDL statements. The framework allows the ability to perform, as multiple transactions, the DDL operations specified by a DDL statement. To begin execution of a DDL statement, a DBMS, for example, updates a flag to indicate that DDL operations have commenced. While the flag is set to this state, the DBMS prevents execution of operations that depend on the DDL statement being executed as an atomic unit. If the DDL operations are aborted, the flag is set to a state that indicates that the execution of the DDL operations did not complete, and the DBMS continues to disallow dependent operations that depend on the atomicity of the DDL statement. Because the flag is used to provide statement atomicity, DDL operations may be performed as multiple transactions. For a DML statement, a mechanism described herein preserves the transactional context of a DML statement. When, for example, a DBMS is executing a transaction and generates a callout, the DBMS prevents operations that may change the transactional context of work performed in response to the callout.

40 Claims, 6 Drawing Sheets

TRANSACTIONAL FRAMEWORK FOR EXECUTING STATEMENTS INVOLVING NON-NATIVE CODE

FIELD OF THE INVENTION

The present invention relates to providing atomicity for statements executed by a database server.

BACKGROUND OF THE INVENTION

In typical database systems, users store, update, and retrieve information by interacting with user applications ("clients"). The clients respond to the user's interaction by submitting commands to a database management system (a "DBMS") responsible for maintaining the database. The database server responds to the commands by performing the specified actions on the database. To be correctly processed, the commands must comply with the database language that is supported by the database server. One popular database language is known as Structured Query Language (SQL).

Various access methods may be used to retrieve data from a database. The access methods used to retrieve data may significantly affect the speed of the retrieval and the amount of resources consumed during the retrieval process. Many access methods use indices to increase the speed of the data retrieval process. A typical DBMS has built-in support for a few standard types of access methods, such as access methods that use B+Trees and Hash Tables, that may be used when the key values belong to standard sets of data types, such as numbers, strings, etc. The access methods that are built-in to a database system are referred to herein as native access methods.

In recent years, databases are being used to store different types of data, such as text, spatial, image, video, and audio data. For many of these complex data types, the standard indexing techniques and access methods cannot readily be applied. To provide efficient data retrieval, many database systems that allow users to store complex data types attempt to provide access methods suitable for the complex data types. However, attempts to provide native support for all types of access methods are unrealistic, because it is not possible to foresee all the possible types of complex data that clients may wish to store in a database, much less all types of access methods that one may wish to use with such data types. To allow database management systems to support non-native index schemes, a mechanism referred to as "extensible indexing" has been developed. Extensible indexing is described, at least in part, in "Extensible Indexing", U.S. application Ser. No. 08/677,159, filed on Jul. 7, 1996 now U.S. Pat. No. 5,893,104 by Jagannathan Srinivasan, Ravi Murthy, Chin Hong, Samuel Defazio, and Anil Nori, and assigned to the assignee of the present application.

Extensible indexing provides a general framework for integrating non-native indexes. The user supplies meta-data defining an index type. In particular, the meta-data defines access methods for the index type, and methods for creating and maintaining data for the index type. Indexes that are managed by methods supplied in this manner are instances of a defined index type, and are referred to herein as domain indexes. The process of creating an index refers to generating metadata defining the index, and generating data structures that hold the index data (e.g. tables). The process of creating an index may also include creating index data reflecting data that already exists in the table being indexed ("base table"), when the base table contains data at the time the index is created.

Domain indexes, like indexes in general, are created in response to database definition language (DDL) statements issued to a DBMS that specify the creation of indexes. A statement is a set of one or more commands executed as an atomic unit. A DDL statement is statement that specifies a definition or change to a definition of a database schema object. A database schema object is a data structure managed by a database management system that may be referenced in a database language, and includes tables, indexes, views, materialized views, data types, and procedures. The operations performed by a DBMS to execute a DDL statement are referred to as DDL operations. DDL operations include creating, changing or deleting database metadata, and data structures used to hold data for the database schema object. For example, in response to receiving a DDL statement specifying the creation of an index, database metadata defining the index is created, one or more database schema objects are created, and index data is generated and stored in these objects.

To process a DDL statement, conventional DBMSs may follow a one statement, one transaction model. The changes specified by a DDL statement are processed by the database server as a single transaction. When a DBMS receives a DDL statement, the DBMS commits before and after executing the DDL statement. A transaction is an atomic unit of work, which may include one or more statements. The term commit refers to making permanent the changes to data specified by a transaction.

Treating the process of creating a domain index as one transaction causes several problems. Some of these problems stem from the DBMS performing callouts to user supplied routines to create domain indexes. A callout is call to an external routine supplied by a user. A callback is call from a callout to the database server.

The following example illustrates the problems that arise from callouts used to generate indexes. A user issues a command statement specifying the creation of a domain index. In response, the DBMS creates metadata describing the domain index, and issues a callout to a user supplied routine for creating the index. The user supplied routine issues a callback, which requests the execution of a DDL statement for creating a table for the index.

In many database systems that follow the one statement, one transaction model for DDL statements, the issuing of a DDL statement causes a commit before and after executing the statement. Thus, after the DDL statement is executed, the work performed before creating the table, and the creation of the table definition itself, is committed. The callout performs additional work, then encounters an error, and aborts the current transaction. As a result, work performed after creating the table definition is rolled back, while the work performed beforehand remains committed.

There are several undesirable consequences to leaving part of the work committed in this manner. The database is not left in the state that existed before the user issued the statement to create the domain index, thus violating the one DDL statement, one transaction model followed by conventional DBMSs for DDL statements. In addition, statement atomicity is also violated. Statement atomicity requires that all the work specified by a statement be performed as an atomic unit. If the DBMS cannot execute the statement completely, any changes caused by executing the statements are rolled back.

Executing DDL statements for domain indexes as one transaction may not be desirable anyway. To create a domain index for a large file, a DBMS may generate a large amount of data, expending a large amount of work. When the work of creating an index is performed as part of one transaction, and the transaction is aborted, the transaction is rolled back, and all the work is wasted.

Callbacks not only cause problems for creating indexes, they may also cause problems when modifying data in a domain index. For example, when a DBMS server receives a statement to modify data in the database (a "DML" statement), and the data is indexed by a domain index, the DBMS invokes a user supplied routine for modifying the domain index. The user supplied routine may execute a commit, causing the current transaction to commit. If the DBMS is unable to complete execution of the DML statement, part of the work performed is committed and can not be rolled back. This situation, as explained earlier, violates statement atomicity.

Based on the foregoing, it is clearly desirable to provide a level of atomicity for executing DDL statements when creating indexes, while providing a means of preserving work performed when the process of creating a domain index is aborted. It is also desirable to provide a method for ensuring statement atomicity when the execution of DML and DDL statements involves callouts.

SUMMARY OF THE INVENTION

Described herein is a framework for providing statement atomicity for DDL statements. According to an aspect of the present invention, the framework allows the ability to perform, as multiple transactions, the DDL operations specified by a DDL statement. To begin execution of a DDL statement, a DBMS, for example, updates a flag to indicate that DDL operations have commenced. While the flag is set to this state, the DBMS prevents execution of operations that depend on the DDL statement being executed as an atomic unit. If the DDL operations are aborted, the flag is set to a state that indicates that the execution of the DDL operations did not complete, and the DBMS continues to disallow dependent operations that depend on the atomicity of the DDL statement. Because the flag is used to provide statement atomicity, DDL operations may be performed as multiple transactions.

According to another aspect of the present invention, a mechanism preserves the transactional context of a DML statement being executed. When, for example, a DBMS is executing a transaction and generates a callout, the DBMS prevents operations that may change the transactional context of work performed in response to the callout.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing atomicity for statements executed by a DBMS is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Described herein is a framework for providing both statement atomicity for DDL statements and the ability to perform, as multiple transactions, the DDL operations specified by a DDL statement. To begin execution of a DDL statement, a DBMS updates a flag to indicate that DDL operations have commenced. While the flag is set to this state, the DBMS prevents execution of operations that depend on the DDL statement being executed as an atomic unit ("dependent operations"). If the DDL operations are aborted, the flag is set to a state that indicates that the execution of the DDL operations did not complete, and the DBMS continues to disallow dependent operations.

Because the flag is used to provide statement atomicity, DDL operations may be performed as multiple transactions. Breaking DDL operations into multiple tasks allows data generated for each transaction to be committed and saved. When the DDL operations are aborted, the data that has been committed is preserved. The DDL operations may be recommenced, building upon the preserved work.

Also described are mechanisms for preserving the transactional context of a DML statement executed by a DBMS. The transactional context of a DML statement is the transaction from which the statement is issued. When a DBMS is executing a transaction and makes a callout, the DBMS prevents any operation that may change the transactional context of the statement.

Exemplary Database Management System

Figure 1:
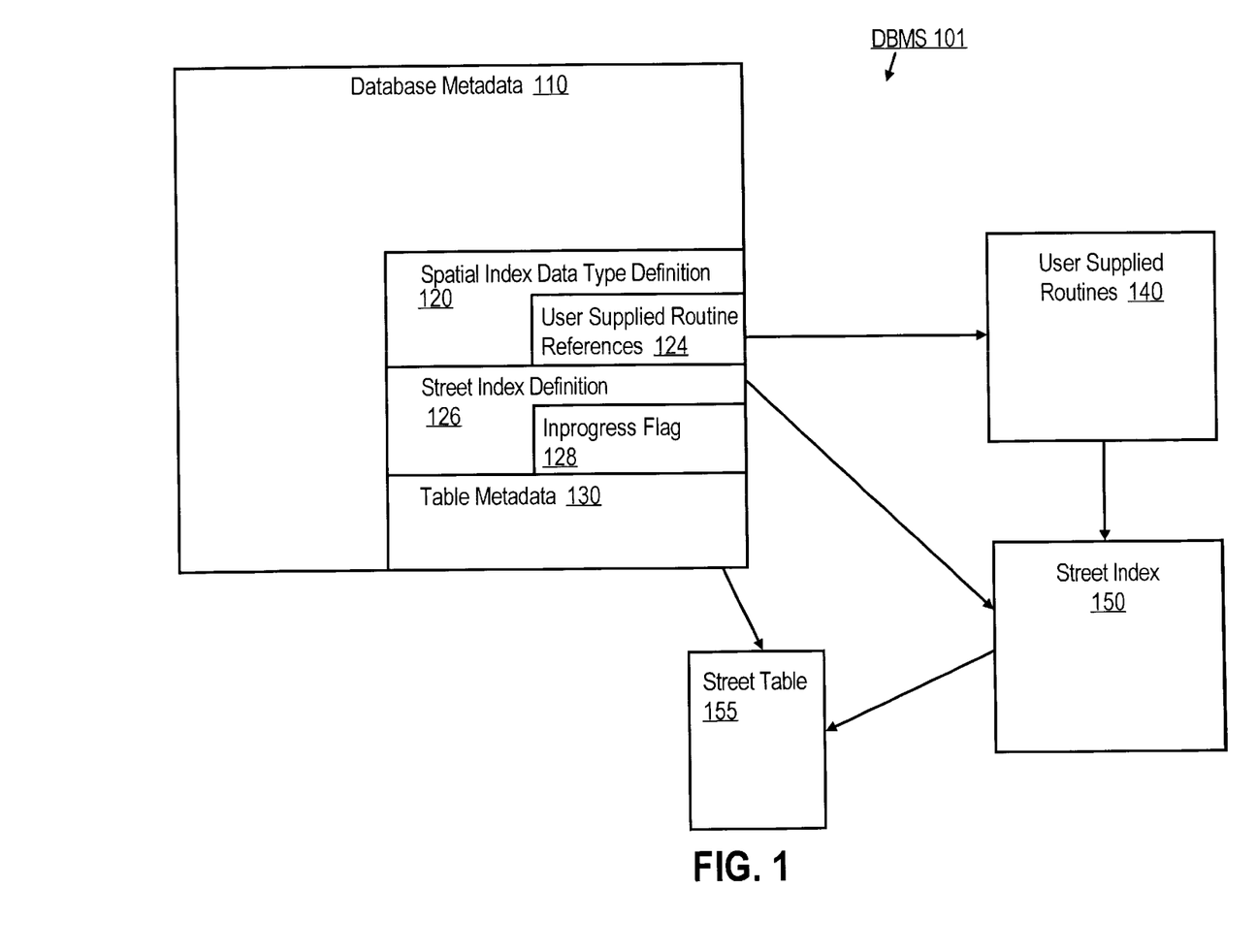
FIG. 1 is a block diagram depicting an exemplary database management system upon which an embodiment of the present invention may be implemented.

FIG. 1 is a block diagram depicting a DBMS upon which an embodiment of the present invention may be implemented. DBMS 101 is a transaction oriented DBMS. A transaction oriented computer system is capable of processing changes to a set of data as transactions may be terminated. Terminating a transaction refers to committing or rolling back the transaction. DBMS 101 includes database metadata 110, user supplied routines 140, a street table 155, and a street index 150.

Database metadata 110 defines database schema objects managed by DBMS 101, such as street table 155 and street index 150. Database metadata 110 includes a spatial index definition 120, a street index definition 126, and table metadata 130. Table metadata 130 defines all of the tables managed by DBMS 101, including, street table 155.

Spatial index type definition 120 defines a domain index type Spatial, and includes user supplied routine references 124. User supplied routine references 124 are references to user supplied routines 140. User supplied routines 140 are routines called by DBMS 101 to maintain, create, and access index data for a domain index belonging to index type Spatial. For example, user supplied routines 140 are used to maintain, create and access street index 150, which is an index of type Spatial.

Street index definition 126 defines a domain index whose index type is Spatial. In the illustrated embodiment, the domain index defined by street index definition 126 is Street Index 150. Street index definition 126 includes inprogress flag 128. An inprogress flag is a data structure that indicates the progress of a process that is modifying the definition of an index. The use of the inprogress flag shall be described in greater detail hereafter.

Because the index type of Street index 150 is Spatial, to manage Street index 150, DBMS 101 calls user supplied routines 140. The user supplied routines, when executed by DBMS 101, may create and perform operations upon Street index 150. Street index 150 contains the index data for Street table 155. To perform a particular operation, DBMS 101 finds the user supplied routine reference 124 designated for that operation, and then calls that routine. For example, DBMS 101 receives a statement specifying updates to a key value in a column of street table 155 that is indexed by street index 150. In response, DBMS 101 finds the user supplied routines 140 for updating Spatial type indexes when a key value changes, and then calls the routine to update Street Index 150.

Framework for Creating or Altering Schema Objects

Figure 2:
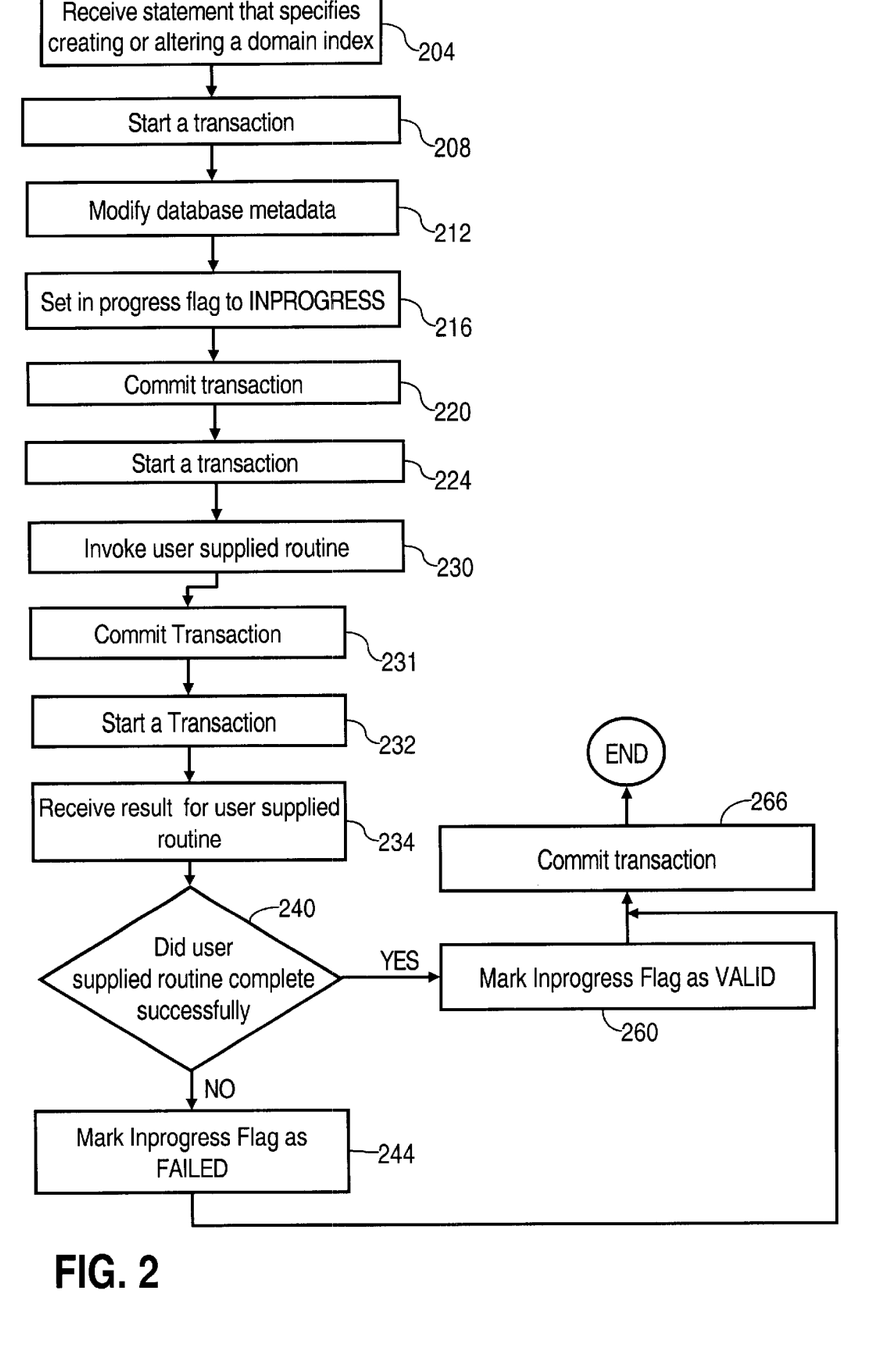
FIG. 2 is a flow chart depicting a process for setting a flag indicating whether operations have commenced to create or alter an index.

An inprogress flag is used to indicate when dependent operations should not be performed. The flag may be set when DBMS 101 begins the DDL operations for creating or altering a domain index. FIG. 2 is a flow chart depicting a process for setting the flag when creating or altering a domain index. The process is illustrated using exemplary DBMS 101 shown in FIG. 1. For purposes of illustration, it shall be assumed that street index definition 126 and street index 150 have not yet been created.

Referring to FIG. 2, at step 204, DBMS 101 receives a DDL statement specifying the creation or altering of a domain index, such as a CREATE or ALTER statement in SQL. In this example, DBMS 101 receives a statement specifying the creation of Street index 150. At step 208, DBMS 101 starts a new transaction.

At step 212, DBMS 101 modifies database metadata 110 to reflect the requested DDL operation. In this example, DBMS 101 generates street index definition 126.

At step 216, DBMS 101 sets the inprogress flag 128 to INPROGRESS. INPROGRESS represents a value that indicates that a DDL operation for Street index 150 has commenced, but has not yet completed.

At step 220, DBMS 101 commits the current transaction. Because the current transaction includes the changes made at steps 212 and 216, the addition of street index definition 126 to database metadata 110 at step 212 and the setting of the inprogress flag at step 216 are committed. At step 224, DBMS 101 starts a new transaction.

At step 230, DBMS 101 generates a callout to execute, at least in part, the requested DDL operations. In this example, DBMS 101 invokes the user supplied routine 140 for creating an index of the index type Spatial.

At step 231, DBMS 101 commits the current transaction. This includes the changes made during the execution of the callout. At step 232, DBMS 101 starts a new transaction.

At step 234, DBMS 101 receives the result from the call out. The result indicates whether the callout completed successfully. In this example, for purposes of illustration, it shall be assumed that the creation of the Street index 150 was aborted. Therefore, the received result indicates that the user supplied routine did not complete successfully.

At step 240, it is determined whether the callout was completed successfully. This determination is based on the result received at step 234. If the callout was completed successfully, then control passes to step 260. At step 260, the progress flag is updated to VALID, a value indicating that the callout completed successfully.

On the other hand, if the callout did not complete successfully, then control passes to step 244. At step 244, the inprogress flag 128 is updated to FAILED, a value indicating that the invoked user supplied routine failed to complete successfully.

In this example, the determination at step 240 is that the user supplied routine did not complete successfully. Therefore control flows to step 244, where inprogress flag 128 is set to FAILED.

At step 266, DBMS 101 commits the current transaction, committing any uncommitted changes for the current transaction. These include the setting of the inprogress flag at either step 244 or step 260.

Framework for Dropping Schema Objects

Figure 3:
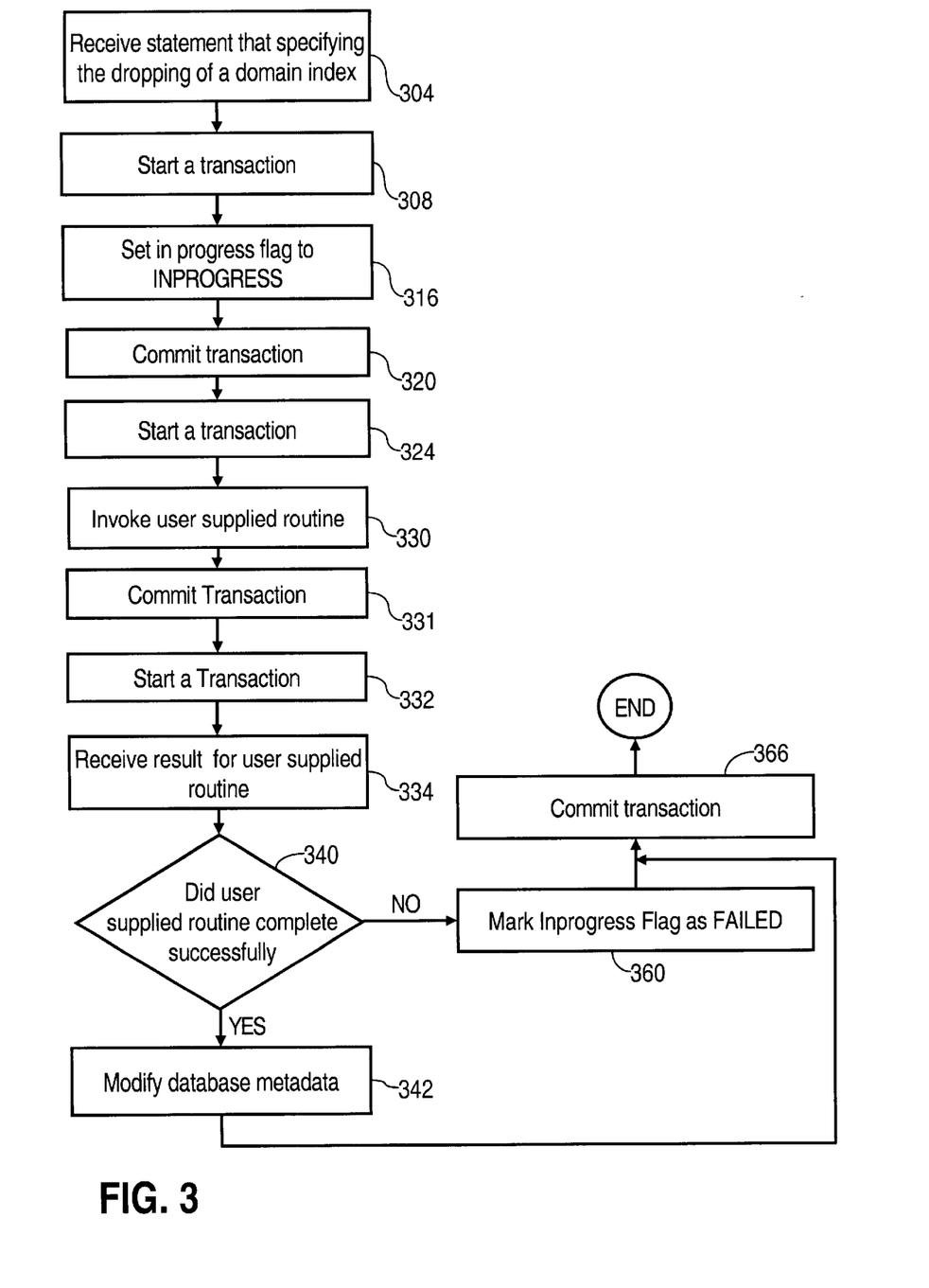
FIG. 3 is a flow chart depicting a process for setting a flag indicating whether operations have commenced to drop an index.

FIG. 3 is a flow chart depicting a process for setting inprogress flag 128 when dropping a domain index. The term dropping refers to performing drop operations. Drop operations are operations that remove the definition of a database schema object from a DBMS, such that the DBMS no longer supports the schema object or uses the database schema object. The process is illustrated using exemplary DBMS 101 shown in FIG. 1.

Referring to FIG. 3, at step 304, DBMS 101 receives a drop statement referencing a domain index. A drop statement is a statement that specifies the dropping of a schema object, such as a domain index. At step 308, DBMS 101 starts a new transaction.

At step 316, DBMS 101 sets the inprogress flag of the domain index that is to be dropped to INPROGRESS. For the purpose of explanation, it shall be assumed that Street Index 150 is to be dropped. Hence, at step 316, inprogress flag 128 is set to INPROGRESS. At step 320, DBMS 101 commits the current transaction. Because the current transaction includes the setting of inprogress flag 128 at step 316, the change to inprogress flag 128 is committed. At step 324, DBMS 101 starts a new transaction.

At step 330, DBMS 101 generates a callout to execute, at least in part, the requested DDL operations. At step 331, DBMS 101 commits the current transaction. This includes the changes made during the execution of the callout. At step 332, DBMS 101 starts a new transaction. At step 334, DBMS 101 receives the result from the call out. The results may indicate whether the callout has completed successfully.

At step 340, it is determined whether the callout has completed successfully. This determination is based on the result received at step 334. If the callout was completed successfully, then control passes to step 342. At step 342, DBMS 101 modifies database metadata 110 to reflect that Street Index 150 has been dropped.

On the other hand, if the callout did not complete successfully, then control passes to step 360. At step 360, the inprogress flag 128 is updated to FAILED.

At step 366, DBMS 101 commits the current transaction, committing any uncommitted changes for the current transaction. These include the setting of the inprogress flag at step 360 or changes to the metadata 110 to reflect that Street Index 150 has been dropped.

Preventing Operations that Depend on a Statement

To provide DDL statement atomicity, DBMS 101 prevents execution of dependent operations. Dependent operations include query operations and DML operations. DML operations are operations performed by a DBMS to execute a DML statement. For example, execution of a query plan A uses Street index 150. To run correctly, the creation of the definition of Street index 150 should be completed. The creation of the definition is complete when both the metadata defining Street index 150 is committed, and the index data for Street Index 150 is completely generated and committed. To run properly, Query plan A should not be executed before the index data for Street index 150 is generated.

DBMS 100 provides index DDL statement atomicity by preventing dependent operations when the inprogress flag 128 indicates that DDL operations have been commenced and not completed. Specifically, when the inprogress flag is set to INPROGRESS or FAIL, dependent operations are not performed.

An error may be encountered while creating the index, and may occur under conditions that leave the inprogress flag 128 set to INPROGRESS. Such errors are referred to herein as unhandled errors. An unhandled error may be caused, for example, by a computer system loosing power. An unhandled error may be indicated when, for example, inprogress flag 128 has been set to INPROGRESS for a period longer than needed to create or drop the index.

To allow recovery from an unhandled error, DBMS 101 permits execution of a DROP INDEX FORCE statement when the inprogress flag 128 is set to INPROGRESS. When DBMS 101 receives a DROP INDEX FORCE command, DBMS 101 executes a user supplied routine 140 configured to "clean up" data generated for the index. For example, the user supplied routine 140 may be configured to drop a table that contains partially generated index data. Even if the user supplied routine 140 returns error, DBMS 101 modifies metadata 110 to reflect that Street Index 150 has been dropped. Thus, the FORCE option is guaranteed to clean up the metadata maintained by the DBMS.

A handled error, on the other hand, is a termination of a DDL operation, where the inprogress flag 128 is set to FAIL. Such errors are termed handled because a user supplied routine 140 has been likely been configured to stop processing upon detecting a "termination condition", and to cause the setting of the inprogress flag 128 when the condition is detected. Developers may not only configure user supplied routines 140 to detect a termination condition, but also may develop a routine that may recommence a terminated process. For example, a user supplied routine may be configured to scan a base table, generate and store index data in another table, and record data indicating the progress of the scan. When detecting that there is insufficient disk storage, the process of creating an index is terminated, and inprogress flag 128 is set to FAIL. After a database administrator allocates the necessary disk storage, DBMS 101 invokes a user supplied routine configured to recommence the creation of the index. The data used to record the progress of the aborted index creation process is examined, and the creation process resumed.

To allow recommencement of DDL operations that are aborted because of a handled error, DBMS 101 executes the ALTER INDEX REBUILD statement for the index when inprogress flag 128 is set to FAIL. When DBMS 101 executes this statement, DBMS 101 executes a user supplied routine configured to recommence the DDL operation that was aborted.

DBMS 101 honors the execution of other DDL statements while the inprogress flag 128 is set to FAIL. These include the SQL DROP and TRUNCATE statements. The DROP statement specifies a DDL operation for dropping an index, and the TRUNCATE statement specifies an operation for dropping all the rows in a table.

Breaking DDL Operations into Transactions

Use of the inprogress flag 128 to provide statement atomicity allows index DDL operations to be broken into transactions without adversely affecting dependent operations. Dividing index DDL operations into transactions allows the data generated at various stages of execution to be committed, and thus saved in the event execution of the operation is terminated. Work performed to generate the data is not wasted, and the index DDL operation can be completed with less work and in less time.

For example, a user supplied routine 140 is called to create an index. The user supplied routine 140 is configured to scan a base table, and generate and store index data in a table. In addition, the routine is configured to commit data periodically and record data that indicates the progress of the scan at a particular commit point. Upon detecting that there is insufficient disk storage, the creation of the index data is terminated, and the inprogress flag 128 is set to FAIL. The creation of an index is resumed when DBMS 101 receives an ALTER INDEX REBUILD for the index. The user supplied routine that is called recommences the creation of index, building upon the previously committed work.

Preventing a Transactional Context Change for DML Operations

Using multiple transactions to perform DDL operations specified by a DDL statement has various advantages. However, as mentioned before, there are disadvantages to breaking the execution of a DML statement into multiple transactions. A callback may specify various requests that may change the transactional context of the callback. For example, execution of a DML statement may entail generation of a callout, and in response to executing the callout, generation of callback. The callback may be specify a request to terminate a transaction (i.e. commit or rollback), or a request to generate a new database session. The execution of the request may cause work performed under the current transaction so far for the DML statement to commit, and work performed subsequently for the DML statement to be performed under a different transaction.

According to one aspect of the invention, a mechanism is provided that prevents a callback from changing the transactional context. Specifically data is stored to record when a callout is being executed for a transaction. If a callback is generated for a transaction when the data indicates a callout is being executed, DBMS 101 prevents operations that change the transaction.

Figure 4:
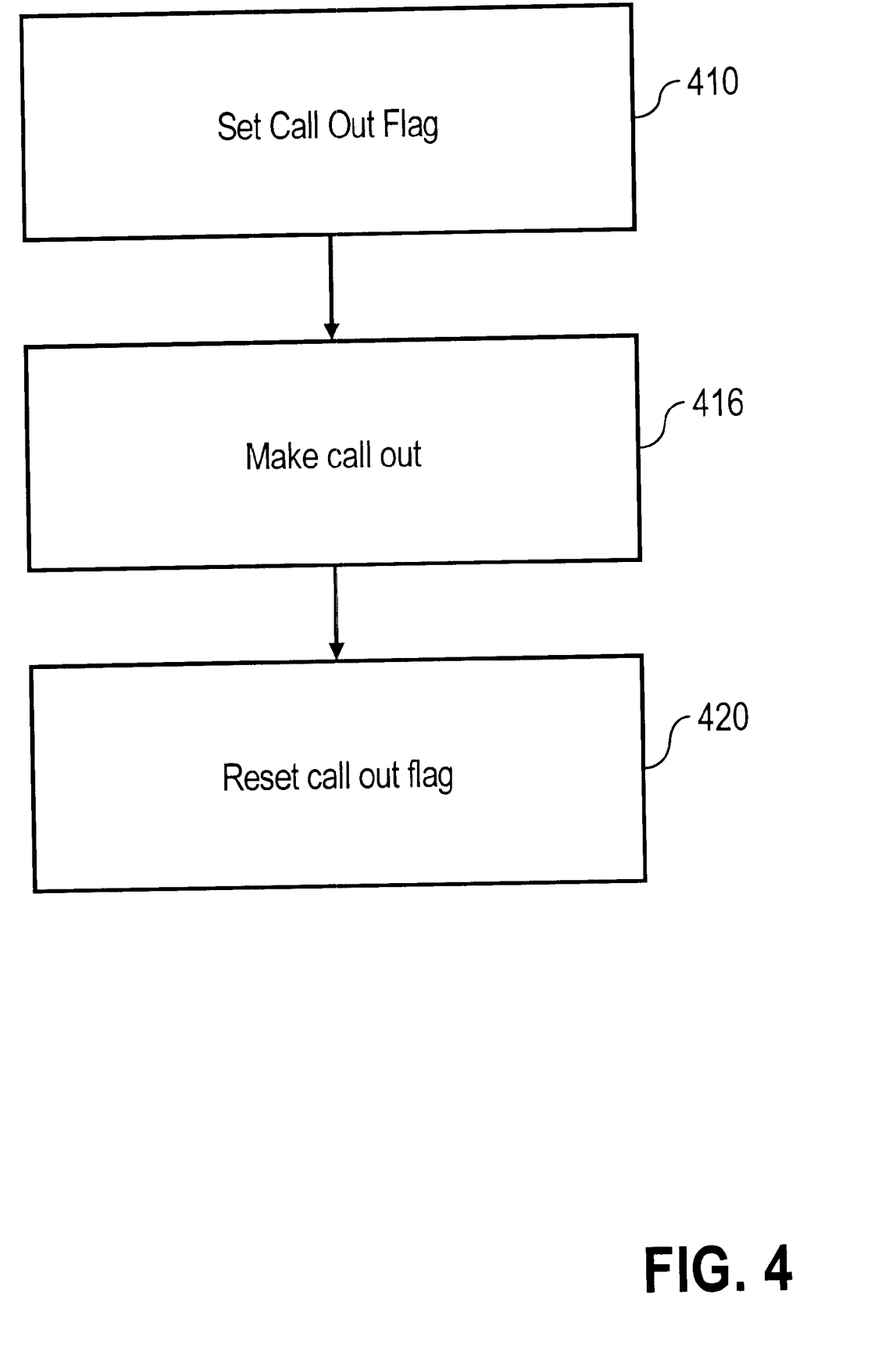
FIG. 4 is a flow chart depicting a process for setting data indicating whether a callout is being executed for a particular transaction.

FIG. 4 shows a process for recording when a DBMS makes a callout for a particular transaction as part of a DML operation. The steps are illustrated using exemplary DBMS 101 as an example. For purposes of illustration, DBMS 101 is updating a key value in a column of Street table 155 as part of a transaction A. To update Street index 150, DBMS 101 invokes a user supplied routine 140.

Referring to FIG. 4, at step 410, DBMS 101 sets a callout flag. A callout flag is a data structure that indicates when DBMS 101 is making a callout for a particular transaction. A callout flag may be, for a example, a field in a record that is used to track the state of a particular transaction. Many DBMSs incorporate such records. The phrase "sets a callout flag" refers to setting a callout flag to a value that specifies that a callout has been commenced and not completed for a particular transaction. In this example, DBMS 101 sets a callout flag indicating that a callout has commenced but not completed for transaction A.

At step 416, DBMS 101 makes the callout to the user supplied routine for updating Street index 150. At step 420, after the callout has been completed, DBMS 101 resets the callout flag for transaction A. The phrase "resets a callout flag" refers to setting a callout flag to a value that specifies that for a particular transaction, there is no callout that has commenced and has not completed for a particular transaction.

Figure 5:
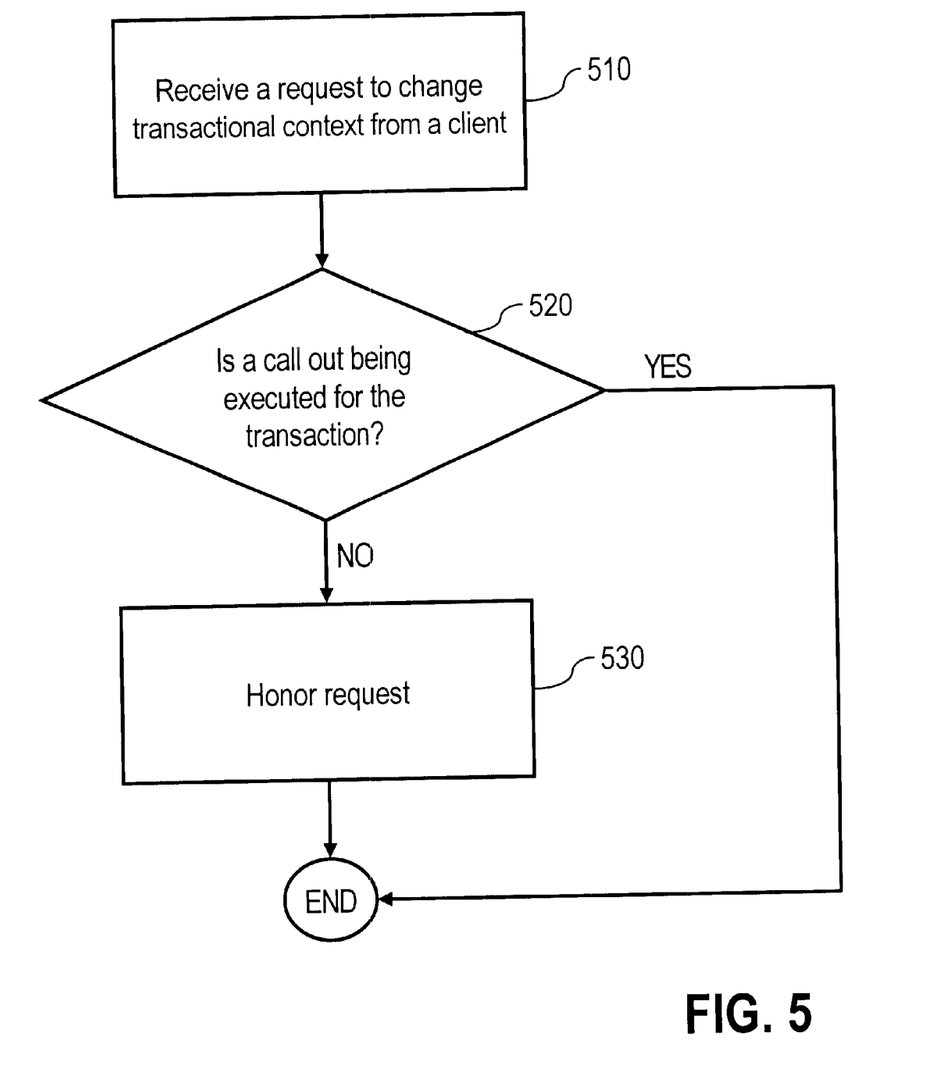
FIG. 5 is a flow chart depicting a process for determining whether a request that changes a transactional context may be honored.

FIG. 5 shows a process that is performed to prevent the execution of a callback from changing the transactional context of a transaction. The steps are illustrated using exemplary DBMS 101 as an example.

At step 510, DBMS 101 receives a message specifying a request to change the transactional context of a transaction. The request may be, for example, to terminate a transaction and start a new session. The message received specifies a transaction with which a request is associated, which is typically the transaction associated with the entity issuing the request. In this example, DBMS 101 receives a message from the callback invoked to change the key column for transaction A.

At step 520, it is determined whether a callout is currently being executed for the transaction associated with the request. If a callout is not currently being executed for the transaction, then control flows to step 530. At step 530, the request is honored, and execution of the steps ends.

If on the other hand, a callout is currently being executed for the transaction, then execution of steps ceases. The request is thus ignored.

Providing Atomicity for Other Types of DDL Operations

The techniques for providing statement atomicity have been illustrated using indexes. However, the present invention is not limited to providing statement atomicity for DDL statements referencing indexes. For example, DBMS 101 may provide statement atomicity for DDL statements referencing other database schema objects (e.g. tables) through the use of an inprogress flag, in a manner similar to that described for DDL statements referencing indexes. Therefore, it is understood that the present invention is not limited to providing statement atomicity for any particular type of DDL statement.

The techniques for providing atomicity for DDL statements are not limited to executing DDL statements that cause callouts. These can be applied to the execution of statements that invoke any type of routine, including routines not supplied by the user.

Hardware Overview

Figure 6:
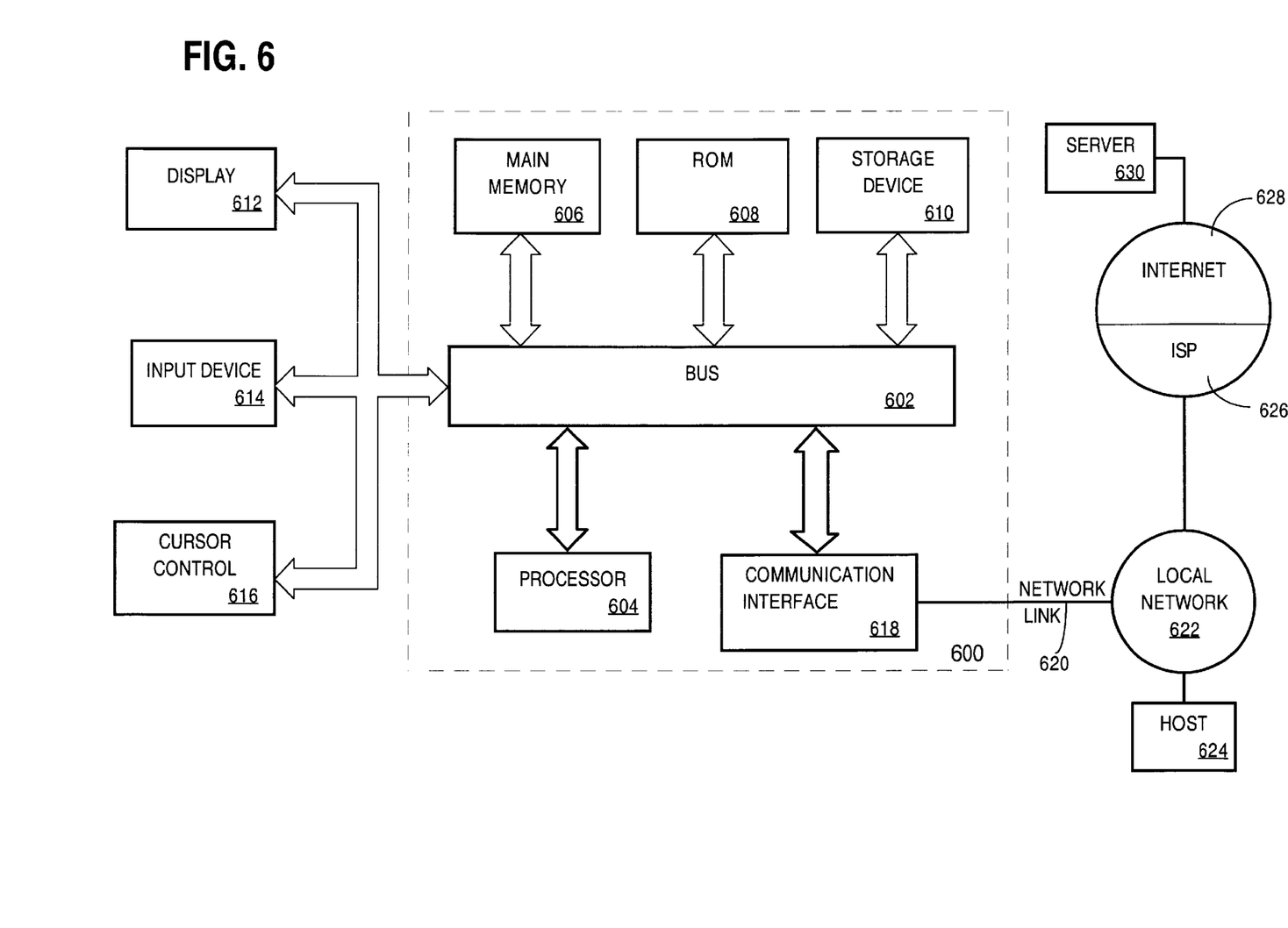
FIG. 6 is a flow chart depicting an exemplary computer system upon which an embodiment of the present invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for providing atomicity for statements executed by a DBMS. According to one embodiment of the invention, providing atomicity for statements executed by a DBMS is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for providing atomicity for statements executed by a DBMS as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments there of. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing atomicity for execution of a transaction, the method comprising the steps of:
    executing a transaction that makes a callout;
    receiving a callback, wherein said callback requests an action that would cause said transaction to terminate;
    determining whether said callback resulted from said callout;
    determining whether performing said action would cause termination of said transaction; and
    if said callback resulted from said callout and performing said action would cause termination of said transaction, then preventing performance of said action.

2. The method of claim 1, wherein:
    the method includes generating a flag that specifies said callout has been made but execution of said callout has not yet completed; and
    wherein the step of determining whether said callback resulted from said callout includes determining whether said flag specifies that said callout has been made but execution of said callout has not yet completed, and
    if said flag specifies that said callout has been made but execution of said callout has not yet completed, then preventing performance of said action.

3. The method of claim 2, wherein the step of executing a transaction that makes a callout includes a database management system calling a user supplied routine for modifying index data in a domain index.

4. The method of claim 2, wherein the step of generating a flag includes modifying metadata defining the domain index to reflect that said callout has been generated but execution of said callout has not yet completed.

5. The method of claim 1, wherein:
    the step of receiving a callback includes receiving a callback that requests to commit said transaction; and
    the step of preventing includes preventing execution of said request to commit said transaction.

6. The method of claim 1, wherein:
    the step of receiving a callback includes receiving a callback that requests to rollback said transaction; and
    the step of preventing includes preventing execution of said request to rollback said transaction.

7. A method of providing atomicity for execution of statements, the method comprising the steps of:
    receiving a DDL statement, wherein execution of said DDL statement entails execution of one or more DDL operations;
    setting a flag that indicates that the execution of said DDL statement has commenced;
    committing said flag;
    after committing said flag, executing at least a portion of said one or more DDL operations; and
    after committing said flag, setting said flag to specify that execution of said one or more DDL operations has been aborted when the execution of said one or more DDL operations has been aborted.

8. The method of claim 7, further including the step of setting said flag to specify that execution of said DDL statement has been successfully completed when the execution of said DDL statement has been successfully completed.

9. The method of claim 7, further including the step of preventing a set of dependent operations while said flag is set to specify that execution of said one or more DDL operations has been aborted.

10. The method of claim 9, wherein the step of preventing a set of dependent operations while said flag is set includes preventing a set of dependant operations that does not include operations performed in response to a DROP INDEX FORCE statement.

11. The method of claim 7, wherein the step of executing at least a portion of said one or more DDL operations includes:
generating data that is uncommitted; and
committing said data.

12. The method of claim 11, wherein:
the step of generating data that is uncommitted includes generating index data; and
the step of committing said data includes committing said index data.

13. The method of claim 11, further including the steps of:
aborting the execution of said one or more DDL operations after committing said data; and
in response to aborting the execution, completing the execution of said one or more DDL operations.

14. The method of claim 7, wherein the step of executing at least a portion of said one or more DDL operations includes generating a callout to a user defined routine.

15. The method of claim 14, wherein the step of generating a callout includes generating a callout to a user defined routine that performs additional DDL operations, wherein said one or more DDL operations include said additional operations.

16. The method of claim 15, further comprising the step of executing a user defined routine in response to generating said callout, wherein the step of executing said user defined routine includes generating a callback to a database management system to create a database schema object.

17. The method of claim 7, wherein:
the step of committing said flag includes committing said flag as part of a first transaction; and
the method further includes the steps of:
creating database metadata that defines a database schema object; and
committing said database metadata as part of said first transaction.

18. The method of claim 17, wherein the step of creating database metadata that defines a database schema object includes creating database metadata that defines a domain index.

19. The method of claim 7, wherein:
the step of committing said flag includes committing said flag as part of a first transaction; and
the method further includes the steps of
generating database metadata that changes a definition of an existing database schema object, and
committing said database metadata that changes the definition as part of said first transaction.

20. The method of claim 7, wherein:
the step of receiving a DDL statement includes receiving a DDL DROP statement, wherein the execution of said DDL DROP statement entails one or more drop operations for dropping a database schema object;
the method further includes the steps of:
completing the execution of said one or more drop operations;
generating modifications to database metadata to reflect that said database schema object has been dropped;
setting said flag to generate modifications that indicate that the execution of said one or more drop operations has been successfully completed; and
committing
said modifications to said flag that specify that execution of said one or more drop operations has been successfully completed, and
said modifications to said database metadata to reflect that said database schema object has been dropped.

21. A computer-readable medium carrying one or more sequences of one or more instructions for providing atomicity for execution of a transaction, the one or more sequences of one or more instructions including instructions which, when executed by one or more processors, cause the one or more processors to perform the steps of:
executing a transaction that makes a callout;
receiving a callback, wherein said callback requests an action that would cause said transaction to terminate;
determining whether said callback resulted from said callout;
determining whether performing said action would cause termination of said transaction;
if said callback resulted from said callout and performing said action would cause termination of said transaction, then preventing performance of said action.

22. A computer-readable medium carrying one or more sequences of one or more instructions for providing atomicity for execution of statements, the one or more sequences of one or more instructions including instructions which, when executed by one or more processors, cause the one or more processors to perform the steps of:
receiving a DDL statement, wherein execution of said DDL statement entails execution of one or more DDL operations;
setting a flag that indicates that the execution of said DDL statement has commenced;
committing said flag;
after committing said flag, executing at least a portion of said one or more DDL operations; and
after committing said flag, setting said flag to specify that execution of said one or more DDL operations has been aborted when the execution of said one or more DDL operations has been aborted.

23. The computer-readable medium of claim 21, wherein:
the steps include generating a flag that specifies said callout has been made but execution of said callout has not yet completed; and
wherein the step of determining whether said callback resulted from said callout includes determining whether said flag specifies that said callout has been made but execution of said callout has not yet completed, and
if said flag specifies that said callout has been made but execution of said callout has not yet completed, then preventing performance of said action.

24. The computer-readable medium of claim 23, wherein the step of executing a transaction that makes a callout includes a database management system calling a user supplied routine for modifying index data in a domain index.

25. The computer-readable medium of claim 23, wherein the step of generating a flag includes modifying metadata defining the domain index to reflect that said callout has been generated but execution of said callout has not yet completed.

26. The computer-readable medium of claim 21, wherein:
the step of receiving a callback includes receiving a callback that requests to commit said transaction; and the step of preventing includes preventing execution of said request to commit said transaction.

27. The computer-readable medium of claim 21, wherein:
the step of receiving a callback includes receiving a callback that requests to rollback said transaction; and
the step of preventing includes preventing execution of said request to rollback said transaction.

28. The computer-readable medium of claim 22, the steps further including the step of setting said flag to specify that execution of said DDL statement has been successfully completed when the execution of said DDL statement has been successfully completed.

29. The computer-readable medium of claim 22, the steps further including the step of preventing a set of dependent operations while said flag is set to specify that execution of said one or more DDL operations has been aborted.

30. The computer-readable medium of claim 29, wherein the step of preventing a set of dependent operations while said flag is set includes preventing a set of dependant operations that does not include operations performed in response to a DROP INDEX FORCE statement.

31. The computer-readable medium of claim 22, wherein the step of executing at least a portion of said one or more DDL operations includes:
generating data that is uncommitted; and
committing said data.

32. The computer-readable medium of claim 31, wherein:
the step of generating data that is uncommitted includes generating index data; and
the step of committing said data includes committing said index data.

33. The computer-readable medium of claim 31, the steps further including:
aborting the execution of said one or more DDL operations after committing said data; and
in response to aborting the execution, completing the execution of said one or more DDL operations.

34. The computer-readable medium of claim 22, wherein the step of executing at least a portion of said one or more DDL operations includes generating a callout to a user defined routine.

35. The computer-readable medium of claim 34, wherein the step of generating a callout includes generating a callout to a user defined routine that performs additional DDL operations, wherein said one or more DDL operations include said additional operations.

36. The computer-readable medium of claim 35, the steps further comprising the step of executing a user defined routine in response to generating said callout, wherein the step of executing said user defined routine includes generating a callback to a database management system to create a database schema object.

37. The computer-readable medium of claim 22, wherein:
the step of committing said flag includes committing said flag as part of a first transaction; and
the steps further include:
creating database metadata that defines a database schema object; and
committing said database metadata as part of said first transaction.

38. The computer-readable medium of claim 37, wherein the step of creating database metadata that defines a database schema object includes creating database metadata that defines a domain index.

39. The computer-readable medium of claim 22, wherein:
the step of committing said flag includes committing said flag as part of a first transaction; and
the steps further include:
generating database metadata that changes a definition of an existing database schema object, and
committing said database metadata that changes the definition as part of said first transaction.

40. The computer-readable medium of claim 22, wherein:
the step of receiving a DDL statement includes receiving a DDL DROP statement, wherein the execution of said DDL DROP statement entails one or more drop operations for dropping a database schema object;
the steps further include:
completing the execution of said one or more drop operations;
generating modifications to database metadata to reflect that said database schema object has been dropped;
setting said flag to generate modifications that indicate that the execution of said one or more drop operations has been successfully completed; and
committing
said modifications to said flag that specify that execution of said one or more drop operations has been successfully completed, and
said modifications to said database metadata to reflect that said database schema object has been dropped.

* * * * *